United States Patent
Cepulis et al.

(10) Patent No.: US 8,521,918 B2
(45) Date of Patent: Aug. 27, 2013

(54) SELECTIVELY HIDING AN INTERFACE CONTROLLER FROM AN OPERATING SYSTEM

(75) Inventors: Darren J. Cepulis, Houston, TX (US); Jason Spottswood, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 31 days.

(21) Appl. No.: 13/386,608

(22) PCT Filed: Nov. 10, 2009

(86) PCT No.: PCT/US2009/063812
§ 371 (c)(1),
(2), (4) Date: Jan. 23, 2012

(87) PCT Pub. No.: WO2011/059428
PCT Pub. Date: May 19, 2011

(65) Prior Publication Data
US 2012/0124246 A1    May 17, 2012

(51) Int. Cl.
*G06F 3/00* (2006.01)
*G06F 13/00* (2006.01)

(52) U.S. Cl.
USPC .......................... 710/15; 710/2; 710/5; 710/8

(58) Field of Classification Search
None
See application file for complete search history.

(56) References Cited

U.S. PATENT DOCUMENTS

| | | | |
|---|---|---|---|
| 5,488,384 A | 1/1996 | Uehara et al. | |
| 6,005,559 A | 12/1999 | Miyamoto | |
| 6,650,322 B2 | 11/2003 | Dai et al. | |
| 6,760,850 B1 | 7/2004 | Atkinson et al. | |
| 6,804,724 B2 | 10/2004 | Shin | |
| 6,839,853 B2 | 1/2005 | Odaohhara et al. | |
| 6,959,399 B2 | 10/2005 | King et al. | |
| 2005/0066129 A1 | 3/2005 | Chang et al. | |
| 2005/0138402 A1* | 6/2005 | Yoon et al. | 713/193 |
| 2005/0229249 A1 | 10/2005 | Piwonka et al. | |
| 2005/0235134 A1* | 10/2005 | O'Sullivan | 712/10 |
| 2006/0101182 A1 | 5/2006 | Drabczuk | |
| 2009/0119520 A1 | 5/2009 | Yoshioka et al. | |
| 2009/0222814 A1 | 9/2009 | Astrand | |

OTHER PUBLICATIONS

International Searching Authority, International Search Report and Written Opinion, Jul. 7, 2010, 12 pages.

* cited by examiner

Primary Examiner — Scott Sun (57) ABSTRACT

A method and other embodiments associated with an interface controller (310) are described. One example method (100) includes monitoring an interface device presence signal for an interface port connector (330) associated with an interface controller (310). The example method (100) also includes controlling (120) the interface controller (310) to be selectively hidden from an operating system (360) in response to the interface device presence signal being negative. The example method (100) further includes controlling (130) the interface controller (310) to be selectively disclosed to the operating system (360) in response to the interface device presence signal being positive.

10 Claims, 5 Drawing Sheets

SELECTIVELY HIDING AN INTERFACE CONTROLLER FROM AN OPERATING SYSTEM

BACKGROUND

External devices like a keyboard can be connected to and/or communicate with a computer through one or more ports. An interface controller is used by the computer to operate and control the ports. During operation of the computer, a computer operating system polls the interface controller to determine if external devices are engaged with the ports. While polling, the processor that executes the operating system functions at a high power state.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Systems and methods associated with selectively hiding an interface controller from an operating system are described. The interface controller may be associated with an interface port connector. The interface port connector may engage with a device. The device provides additional functionality to a computer system. For example, the device may be a keyboard. The keyboard allows a user to enter alphanumeric information to the computer system.

In one embodiment, the computer system discovers the device, loads appropriate drivers, and uses the device. In one example, device discovery occurs by the computer system polling the interface controller. Polling may occur by the computer system periodically checking the interface controller. This checking determines if a device is engaged with the interface port connector. If the device is engaged, then the computer system may stop polling and use the device.

The computer system is in a high power state regardless of whether the computer system is polling or using the device. Specifically, a computer system portion that communicates with the interface controller is in a high power state. It may be undesirable to have the computer system portion in a high power state both when a device is connected and not connected to the interface port connector.

The interface controller may be hidden from the computer system when a device is not engaged with the interface port connector. If the computer system does not know about the interface controller, then the computer system is not aware of a controller to poll. Without being aware of a controller to poll, the computer system may enter a low power state until the device engages the interface port connector. When the interface port connector engages with a device, the interface controller becomes unhidden to the computer system. With the interface controller unhidden, the computer system recognizes the interface controller and enters a high power state.

The following includes definitions of selected terms employed herein. The definitions include various examples and/or forms of components that fall within the scope of a term and that may be used for implementation. The examples are not intended to be limiting. Both singular and plural forms of terms may be used within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

The following are definitions for acronyms used herein: ASIC: application specific integrated circuit; CD: compact disk; CD-R: CD recordable; CD-RW: CD rewriteable; DVD: digital versatile disk and/or digital video disk; RAM: random access memory; ROM: read only memory.

"Computer-readable medium", as used herein, refers to a storage medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other tangible media from which a computer, a processor or other electronic device can read.

"Logic", as used herein, includes but is not limited to hardware, firmware, instructions stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic, and so on. The physical manipulations transform electronic components and/or data from one state to another.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 1:
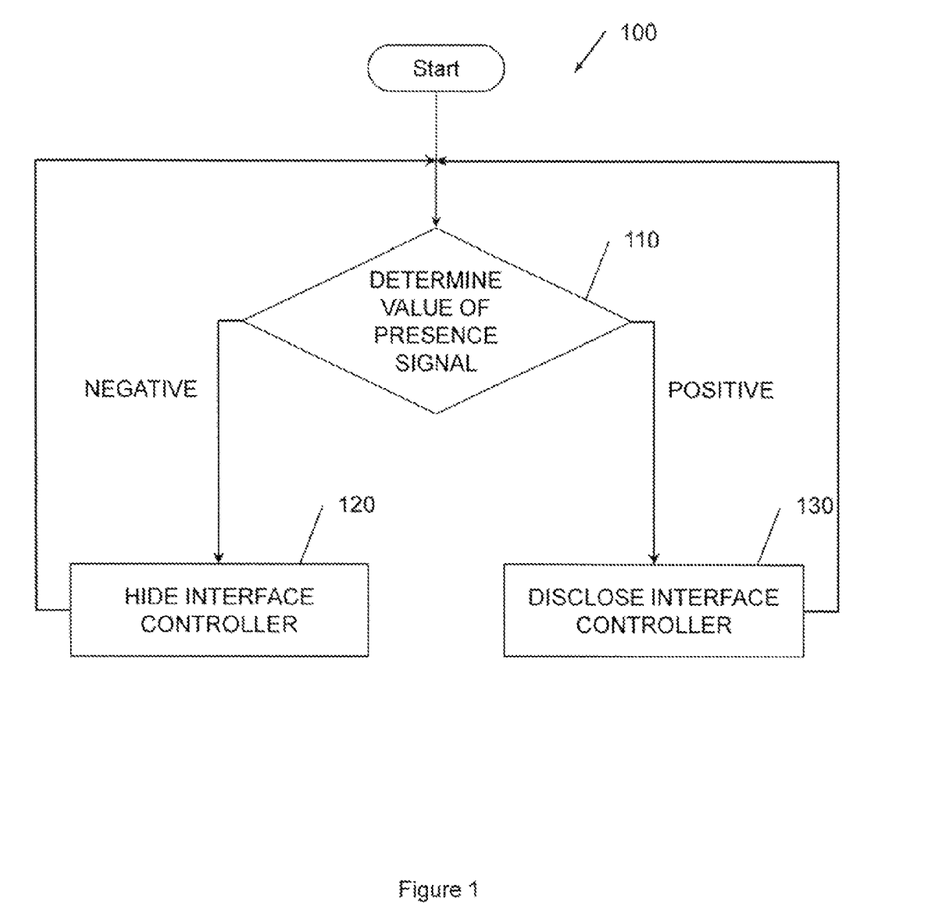
FIG. 1 illustrates one embodiment of a method associated with monitoring an interface device presence signal.

FIG. 1 illustrates a method 100 associated with monitoring an interface device presence signal. The interface device presence signal may be a signal that indicates if a device is engaged with an interface port connector. At 110, the interface device presence signal is monitored. With this monitoring, the interface device presence signal is determined to be positive or negative. The interface device presence signal may represent engagement status for an interface port connector associated with an interface controller.

The interface controller may be controlled as a function of the interface device presence signal. At 120, the interface controller is controlled to be selectively hidden from an operating system. Selective hiding is performed in response to the interface device presence signal being negative. Selective hiding makes the operating system unaware of the interface controller. With the operating system being unaware of the interface controller, the computer system does not believe polling should occur. Without polling, a computer system portion configured to poll the interface controller may be placed in a low power or sleep mode.

At 130, the interface controller is controlled to be selectively disclosed to the operating system. Selective disclosure is performed in response to the interface device presence signal being positive. With the selective disclosure, a computer system portion configured to poll the interface controller may be awoken. When awoken, the computer system may enter a high power state.

Figure 2:
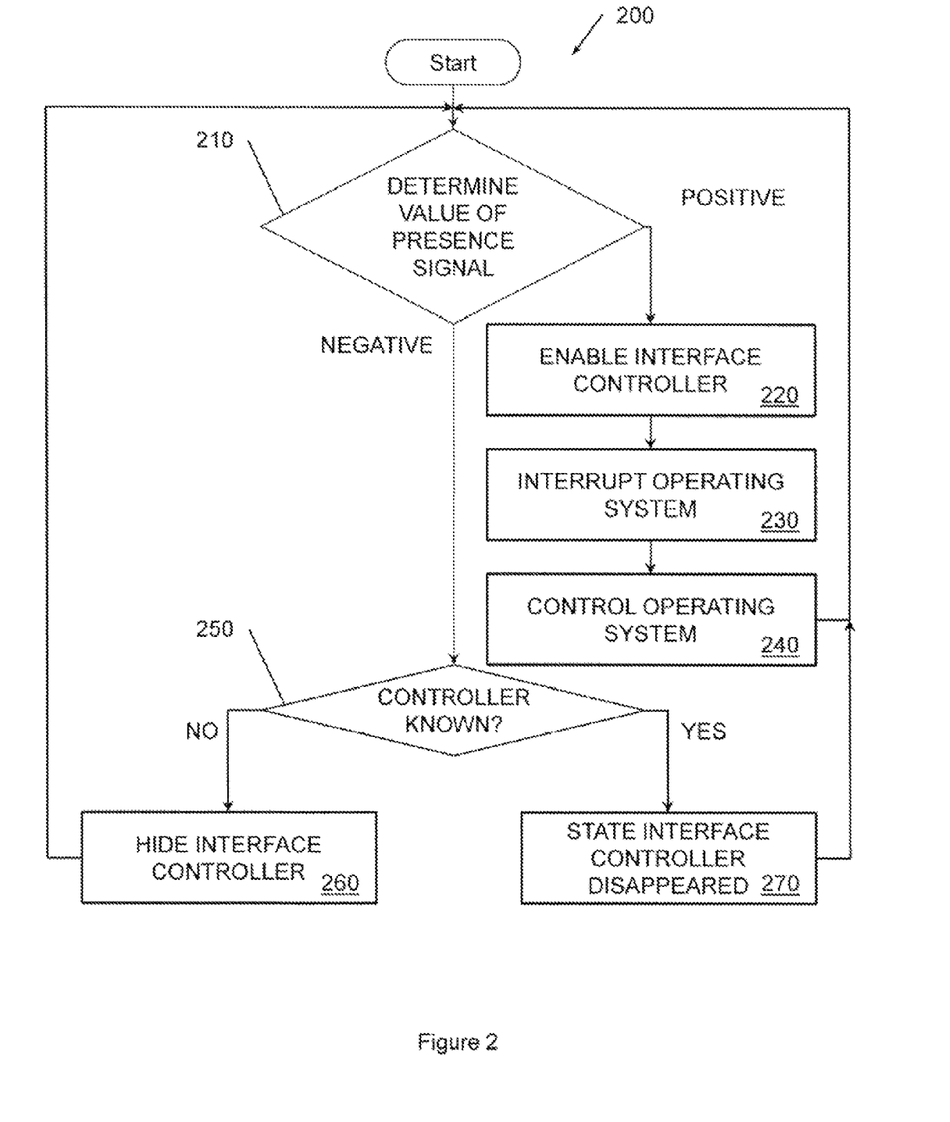
FIG. 2 illustrates one embodiment of a method associated with monitoring an interface device presence signal.

FIG. 2 illustrates a method 200 associated with monitoring an interface device presence signal. At 210, an interface device presence signal for an interface port connector associated with an interface controller is monitored. In one example, the monitoring determines if the interface device presence signal is positive or negative. The interface device presence signal may be positive. In one example, a positive interface device presence signal indicates that an interface device is connected to the interface port connector.

At 220, the interface controller may be enabled in response to the interface device presence signal being positive. Enabling the interface controller may include supplying power to the interface controller. Enabling the interface controller may include loading a driver that facilitates an operating system to use the interface device connected to the interface port connector. Enabling the interface controller may include setting a bit value associated with the interface controller. After the interface controller is enabled, the interface controller is controlled to be to be selectively disclosed to the operating system.

To control the interface controller to be selectively disclosed, the method 200 may, at 230; interrupt the operating system. At 240, in response to the interruption, the operating system is controlled to become aware of the interface controller. Once aware, the operating system can change at least one computer system portion running the operating system to a high power state.

The interface device presence signal may be negative. In one example, a negative interface device presence signal indicates that the interface device is not connected to the interface port connector. In response to the device presence signal being negative, the interface controller is controlled to be selectively hidden from the, operating system. In one embodiment, at least one computer system portion running the operating system is in a low power state in response to the interface controller being selectively hidden.

The operating system may or may not already be aware of the interface controller. At 250, a check occurs to determine if the operating system is already aware of the interface controller. If the operating system is not already aware of the interface controller, then at 260 the interface controller is hidden from the operating system. If the operating system is aware of the interface controller, then, at 270, the operating system may be informed that the interface controller no longer exists. For example, the operating system may receive a notice the interface controller disappeared.

In one embodiment, the interface controller may be a universal serial bus (USB) controller. The interface device presence signal may be a USB device presence signal. The interface port connector may be a USB port connector. It is to be appreciated that other interface types may be used. While not being shown with an end, it is to be appreciated that the methods 100 (FIG. 1) and 200 may end when the computer system loses power or when an instruction is received to no longer perform hiding.

In one example, a method may be implemented as computer executable instructions. Thus, in one example, a computer-readable medium may store computer executable instructions that if executed by a machine (e.g., processor) cause the machine to perform a method that includes at least part of method 100 and/or method 200. While executable instructions associated with the above method are described as being stored on a computer-readable medium, it is to be appreciated that executable instructions associated with other example methods described herein may also be stored on a computer-readable medium.

Figure 3:
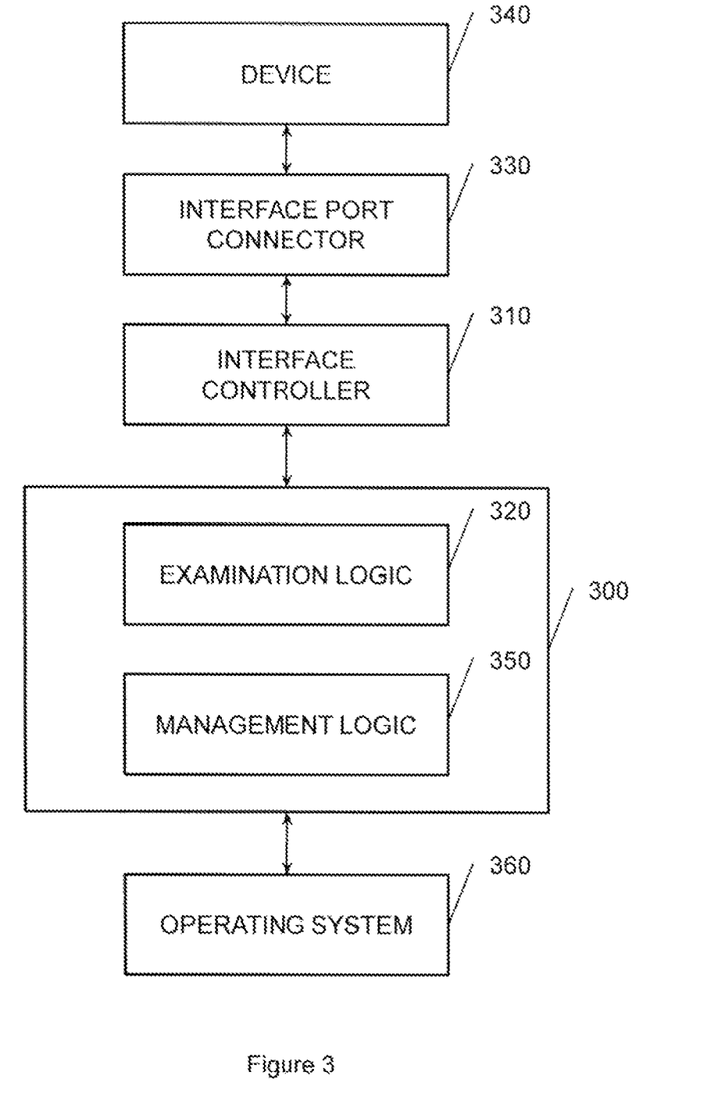
FIG. 3 illustrates one embodiment of a system for managing an interface controller.

FIG. 3 illustrates a system 300 for managing an interface controller 310. The system 300 includes examination logic 320. The examination logic 320 is configured to monitor an interface device presence signal for an interface port connector 330 associated with the interface controller 310. The examination logic 320 may perform the monitoring during a power-on self test. The interface device presence signal that is monitored may indicate if a device 340 is engaged with the interface port connector 330.

The system 300 may include management logic 350. The management logic 350 is configured to selectively hide the interface controller 310 from an operating system 360. Selective hiding may be performed in response to the interface device presence signal being negative. The management logic 350 may also be configured to selectively disclose the interface controller 310 to the operating system 360. Selective disclosure may be performed in response to the interface device presence signal being positive. A person of ordinary skill in the art will appreciate that a positive interface device presence signal can indicate that the device 340 is engaged with the interface port connector 330. The person of ordinary skill in the art will also appreciate that a negative interface device presence signal can indicate that the device 340 is not engaged with the interface port connector 330.

Figure 4:
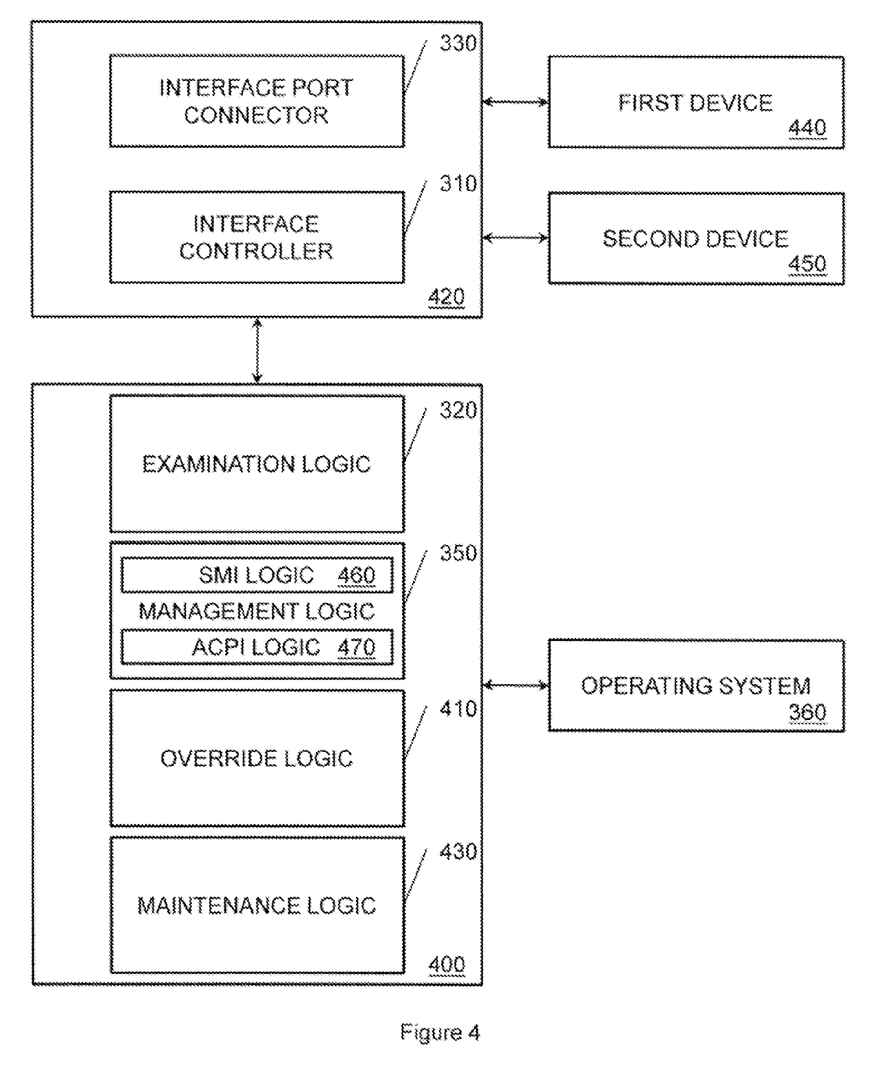
FIG. 4 illustrates one embodiment of a system for managing an interface controller.

FIG. 4 illustrates a system 400 for managing an interface controller 310. The system 400 may include the examination logic 320 and the management logic 350. The system 400 may also include override logic 410. The override logic 410 is configured to enable a user to supersede the management logic 350. The override logic 410 is also configured to enable the user to control whether an operating system 360 is aware of interface controller 310. In one embodiment, the interface controller 310 is located on a Southbridge. In another embodiment, the interface controller 310 and an interface port connector 330 integrate into an interface module 420.

The system 400 may include maintenance logic 430. The maintenance logic 430 is configured to enable the interface controller 310 while the management logic 350 hides the interface controller 310 from the operating system 360. The interface controller 310 may be prepared for use with a specific device prior to the operating system 360 becoming aware of the specific device. Therefore, when the operating system 360 becomes aware of the specific device, the interface controller 310 is ready for use by the operating system 360.

Different devices may engage with the interface port connector 330. For example, a first device 440 may engage with the interface port connector 330. The first device 440 may be removed. Then a second device 450 may engage with the interface port connector 330.

The examination logic 320 may observe that a device is no longer connected to the interface port connector 330. Being no longer connected may include if the device is physically removed by a user or the device no longer engages electronically with the interface port connector 330. In response to observing that the device is no longer connected to the interface port connector 330, the interface controller 310 may be selectively masked. The management logic 350 may selectively mask the interface controller 310 from the operating system 360.

In one embodiment, the device is the first device 440. The device may be connected, removed, and then re-connected. The examination logic 320 may observe that the device is connected to the interface port connector 330 after the device is no longer connected. In response to this observation, the management logic 350 selectively reveals the interface controller 310 to the operating system 360.

In one embodiment, the first device 440 is engaged with the interface port connector 330. The first device 440 is removed and the second device 450 is engaged with the interface port connector 330. The examination logic 320 observes that the second device 450 is connected to the interface port connector 330 after the first device 440 is no longer connected. The management logic 350 selectively reveals the interface controller 310 to the operating system 360. Selective revealing may occur in response to observing that the second device 450 is connected to the interface port connector 330. The maintenance logic 430 may disable the interface controller 310 in response to observing that the second device 450 is no longer connected to the interface port connector 330. A person of ordinary skill in the art will appreciate that masking hides the interface controller 310 from an operating system 360. The person of ordinary skill in the art will also appreciate that revealing discloses the interface controller 310 to the operating system 360.

In one embodiment, System Management Interface (SMI) mechanisms and Advanced Configuration and Power Interface (ACPI) mechanisms hide and un-hide the interface controller 310. In one example, SMI logic 460 un-hides and re-enables the interface port connector 330 and interface controller 310. This un-hiding and re-enabling may be done in response to the interface port connector 330 being engaged with a device.

In addition, ACPI logic 470 may inform the operating system 360 to discover the device and interface controller 310. In one embodiment, SMI logic 460 monitors the interface controller 310. When the interface device presence signal is positive, the SMI logic 460 causes an ACPI event in the ACPI logic 470. The ACPI event is used with an ACPI method to inform the operating system 360 to discover the device and interface controller 310. In one example, the ACPI event causes the operating system 360 to run the ACPI method.

SMI mechanisms and ACPI mechanisms may also be used to hide the interface controller 310 from the operating system 360. In one example, the SMI logic 460 hides the interface controller 310 from the operating system 360 in response to the interface device presence signal being negative. In one embodiment, the management logic 350 includes the SMI logic 460 and ACPI logic 470.

Figure 5:
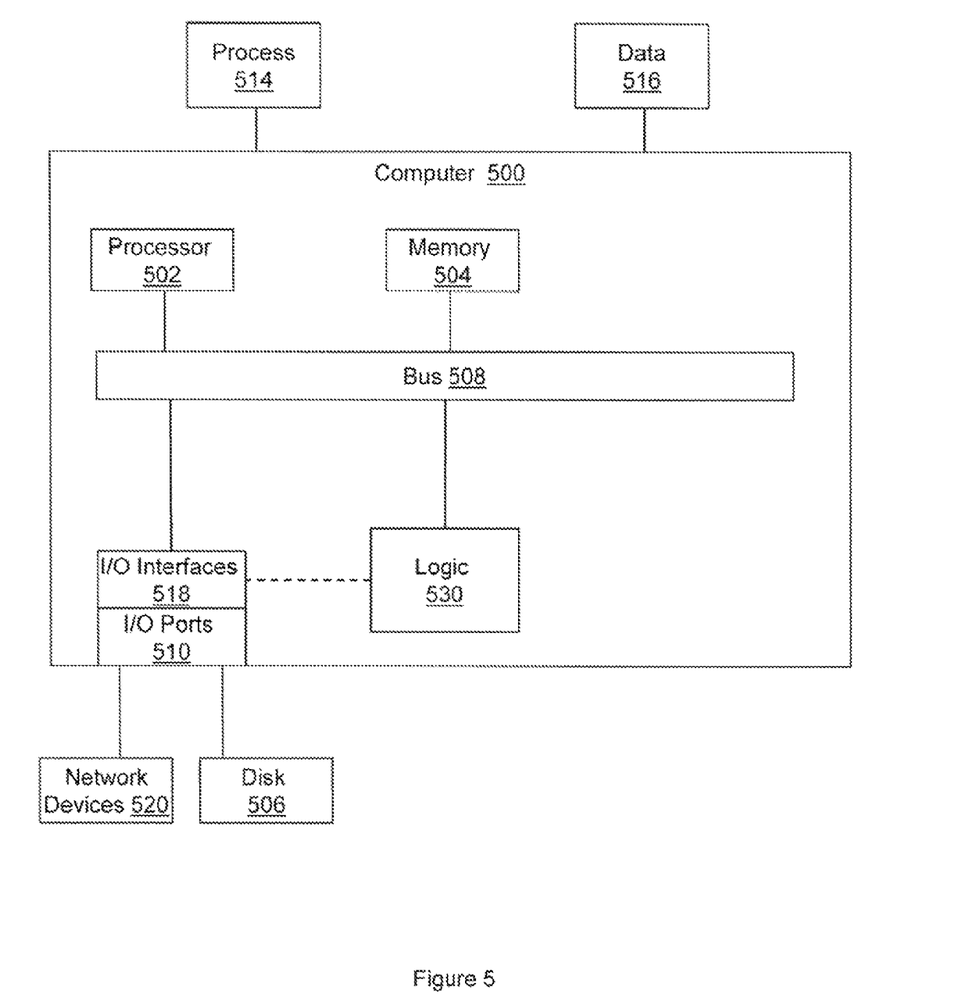
FIG. 5 illustrates an example computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a logic 530 configured to manage disclosure of an interface controller to an operating system. In different examples, the logic 530 may be implemented in hardware, software, firmware, and/or combinations thereof. While the logic 530 is illustrated as a hardware component attached to the bus 508, it is to be appreciated that in one example, the logic 530 could be implemented in the processor 502.

Thus, logic 530 may function as the examination logic 310 and the management logic 350 shown in FIG. 3. The logic 530 may also function as at least one logic discussed in FIG. 4. The logic 530 may be implemented, for example, as an ASIC. The logic 530 may also be implemented as computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM or PROM. Volatile memory may include, for example, RAM, SRAM, and DRAM.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, and a memory stick. Furthermore, the disk 506 may be a CD-ROM drive, a CD-R drive, a CD-RW drive, a DVD ROM drive, a Blu-Ray drive, and an HD-DVD drive. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, and the network devices 520. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method, comprising:
monitoring an interface device: presence signal for an interface port connector associated with an interface controller;
controlling the interface controller to be selectively hidden from an operating system in response to the interface device presence signal being negative; and
controlling the interface controller to be selectively disclosed to the operating system in response to the interface device presence signal being positive.

2. The method according to claim 1, where a negative interface device presence signal indicates that an interface device is not connected to the interface port connector and where a positive interface device presence signal indicates that the interface device is connected to the interface port connector.

3. The method according to claim 1, comprising first enabling the interface controller in response to the interface device presence signal being positive, and then controlling the interface controller to be selectively disclosed.

4. The method according to claim 3, where enabling the interface controller comprises at least one of supplying power to the interface controller, loading a driver that facilitates the operating system to use an interface device connected to the interface port connector, and setting a bit value associated with the interface controller.

5. The method according to claim 1, where the interface device presence signal is a universal serial bus (USB) device presence signal, where the interface port connector is a USB port connector, and where the interface controller is a USB controller.

6. A system, comprising:
examination logic configured to monitor an interface device presence signal for an interface port connector associated with an interface controller during a power-on self test; and
management logic configured to selectively hide, the interface controller from an operating system in response to the interface device presence signal being negative and configured to selectively disclose the interface controller to the operating system in response to the interface device presence signal being positive.

7. The system according to claim 6, comprising:
System Management Interface logic configured to un-hide the interface controller in response to the interface device presence signal being positive; and Advanced Configuration and Power Interface logic configured to inform the operating system to discover the interface controller in response to the interface controller becoming un-hidden.

8. The system according to claim 6, comprising:
maintenance logic configured to enable the interface controller while the management logic hides the interface controller from the operating system.

9. The system according to claim 6, where the management logic is configured to selectively reveal the interface controller to the operating system in response to observing that a device is connected to the interface port connector.

10. The system according to claim 9, comprising:
maintenance logic for disabling the interface controller in response to observing that the device is no longer connected to the interface port connector.

* * * * *

UNITED STATES PATENT AND TRADEMARK OFFICE
CERTIFICATE OF CORRECTION

PATENT NO. : 8,521,918 B2  
APPLICATION NO. : 13/386608  
DATED : August 27, 2013  
INVENTOR(S) : Darren J. Cepulis et al.

It is certified that error appears in the above-identified patent and that said Letters Patent is hereby corrected as shown below:

In the Claims

In column 7, line 53, in Claim 1, delete "device:" and insert -- device --, therefor.

In column 8, line 31, in Claim 6, delete "hide," and insert -- hide --, therefor.

Signed and Sealed this  
Third Day of December, 2013

Margaret A. Focarino  
*Commissioner for Patents of the United States Patent and Trademark Office*